(12) United States Patent
DiStefano

(10) Patent No.: US 6,924,978 B2
(45) Date of Patent: Aug. 2, 2005

(54) METHOD AND SYSTEM FOR COMPUTER SYSTEM VENTILATION

(75) Inventor: Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 10/329,477

(22) Filed: Dec. 27, 2002

(65) Prior Publication Data

US 2004/0125558 A1 Jul. 1, 2004

(51) Int. Cl.[7] .............................................. H05K 7/20
(52) U.S. Cl. .................... 361/688; 361/687; 361/695; 361/700; 165/104.33; 454/184
(58) Field of Search .................. 361/687, 692–697, 361/698, 704, 712; 165/80.3, 121, 122, 104.21, 104.26, 104.33; 257/715, 722, 727; 174/15.2, 16.3; 454/184; 62/259.2

(56) References Cited

U.S. PATENT DOCUMENTS 6,587,343 B2 * 7/2003 Novotny et al. ............ 361/698
6,732,786 B1 * 5/2004 Lee ............................ 165/80.3

* cited by examiner

Primary Examiner—Michael Datskovskiy
(74) Attorney, Agent, or Firm—Kenyon & Kenyon

(57) ABSTRACT

Embodiments of the present invention provides an electronic component cooling system and method that diverts a portion of a cooling fan's cooling air from high power electronic components such as processors and directs the cooling air to other electronic components of a system. Active cooling air may be provided at higher velocities and lower temperatures to cool electronic components of a system such as a computer or other electronic device. An attach block may be thermally coupled to a first electronic component. A heat exchanger may be thermally coupled to the attach block. A cooling fan may receive inlet air and may generate cooling air. A plenum duct between the cooling fan and the heat exchanger may direct the generated cooling air from the fan to the heat exchanger. A portion of the generated cooling air from the cooling fan may be diverted towards a second electronic component included in the system.

29 Claims, 3 Drawing Sheets

METHOD AND SYSTEM FOR COMPUTER SYSTEM VENTILATION

TECHNICAL FIELD

The present invention relates to providing ventilation in a computer system. In particular, the present invention relates to a cooling system for cooling electronic components in a computer.

BACKGROUND OF THE INVENTION

In a computer system, electronic components such a processor unit and other components such as a memory controller hub (MCH), I/O controller hub (ICH), voltage regulators for processor units, system voltage regulators, etc. can generate tremendous amounts of heat. If this heat is not dissipated, these components can be damaged and/or cease to perform. A cooling fan and/or a heat sink may be used to cool the electronic component.

In computers such as modern mobile computers, the closed environment and severe space limitations make the cooling of electronic components even more challenging and critical. One conventional cooling technique may use an attach block that may be thermally coupled to an electronic component. The attach block may be a copper plate or another conductor which conducts heat away from the electronic component. Heat may be dissipated from the attach block to a heat exchanger via a heat pipe such as a metal tube or the like. A cooling fan may blow cool air at a high velocity over the heat exchanger, thus effectively removing heat from the hottest components such as processor units through conduction. This method is quite effective in cooling the processor unit.

Due to space limitations in modern computers, cooling fans may be reserved for the higher heat dissipating and/or power consuming components such as processors. In such computer systems, other electrical components such as the MCH, ICH, voltage regulators, hard drives, etc. may be cooled via passive air such as the inlet air provided to the cooling fan.

Conventional techniques may pull the fan inlet air across the system, for system cooling, then into the fan. Such techniques are disadvantageous in that they may not produce high velocity cooling air to cool system components, and may further result in excess drag (load) on the fan, cooling of components that need not be cooled, and/or pre-heating of air to the otherwise efficient solution for cooling components such as a processor unit.

Such passive mechanisms for cooling system components use air at low velocities that may not be sufficiently cool to be effective. Such mechanisms for cooling system components can be inefficient.

DETAILED DESCRIPTION

Embodiments of the present invention provide an electronic component cooling system and method that diverts a portion of a cooling fan's cooling air from high power electronic components such as processors and directs the cooling air to other electronic components of a system. The invention provides active cooling air at higher velocities and lower temperatures to cool electronic components of a system such as a computer or other electronic device.

Figure 1:
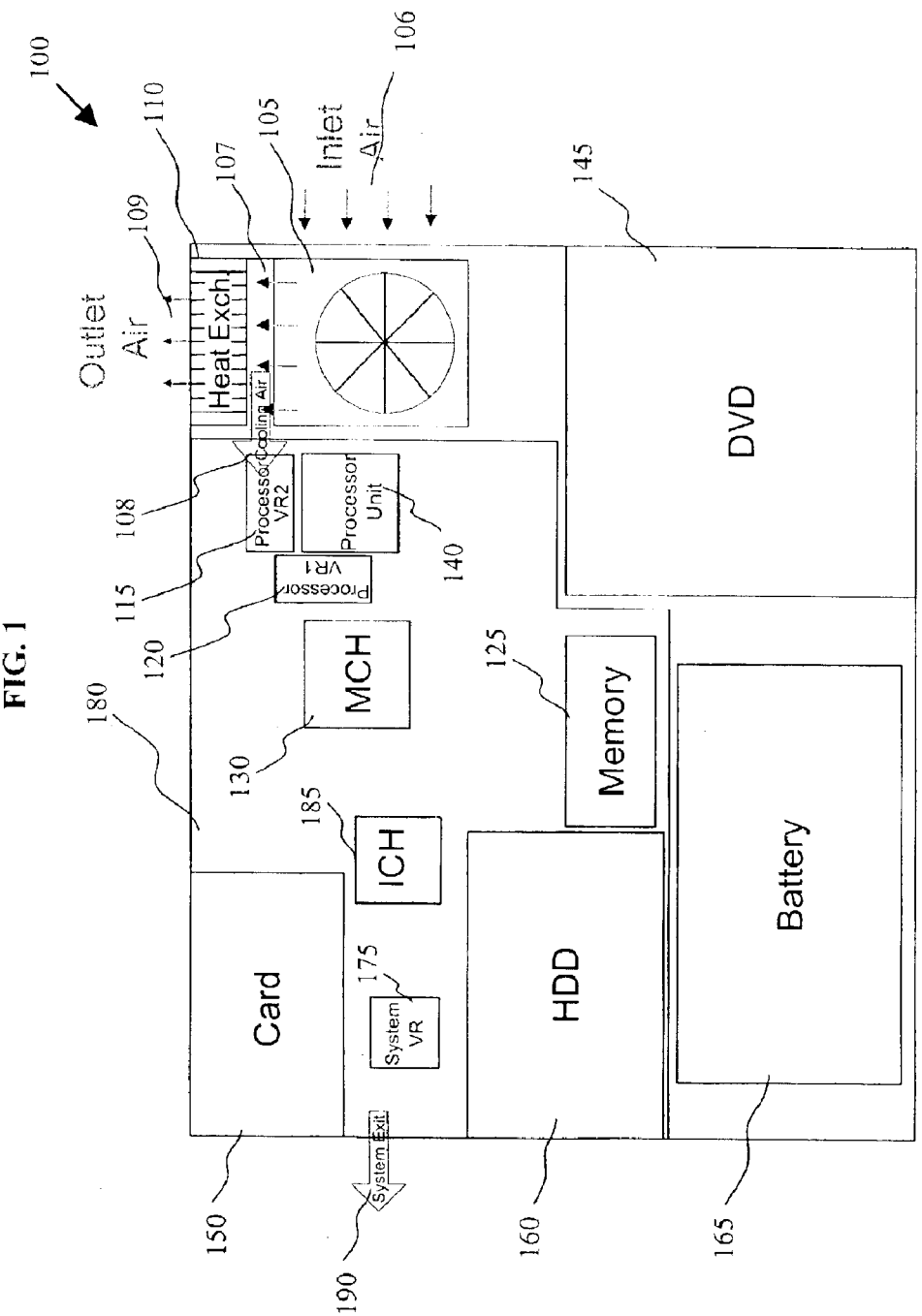
FIG. 1 is a block diagram in accordance with an embodiment of the present invention.

FIG. 1 is a block diagram layout of a computer system 100 in accordance with embodiments of the present invention. In this example, the computer system 100 may be a mobile computer such as a notebook or laptop computer. However, it is recognized that embodiments of the present invention may find application is a desktop computers, main-frames, hand held electronic devices such as PDA's and/or any other devices that may use a cooling fan to cool internal components.

The computer system 100 may include, for example, a motherboard 180, battery 165, a digital video disc (DVD) player 145, a cooling fan 105, a heat exchanger 110, etc. The mother board 180 may include such components as a processor unit 140, voltage regulators for a processor unit (VR1 and VR2) 115, 120, a hard disk drive (HDD) 160, a memory card or other type of card or device 150, a memory controller hub (MCH) 130, I/O controller hub (ICH) 185, a system voltage regulator (VR) and memory. It is recognized that the computer system 100 may include additional components that are not shown for simplicity.

The various components shown in FIG. 1 may consume a majority of the power, and in operation may generate most of the heat in the system 100. Such components may include the processor unit 140, the various VRs 115, 120, 175, memory 125 which may consume anywhere from approximately 2 to 20 watts (W) of power. The other components such as the ICH, DVD, HDD may consume anywhere from 0.3 to 1 W of power. These components may generate large amounts of heat and must be cooled adequately. In this example, the computer system 100 may be a thin notebook computer that is encapsulated typically in a plastic body. In such systems, adequate ventilation is crucial in maintaining proper system and/or component level operation.

In embodiments of the present invention, the cooling fan 105 may be used to cool the various components in the system 100. Since the system 100 may be very thin and compact, the various components may be tightly packed and/or may need to be horizontally situated so as to maintain height requirements. For example, the height of the various components such as the cooling fan, heat exchanger, etc. may vary anywhere from 5 mm to 40 mm in thickness, for example. It is recognized however, that these components may be of any thickness or size such as less than 5 mm and/or greater than 40 mm in thickness.

In embodiments of the present invention, to maintain height requirements, the heat exchanger 110 may be remotely located from the processor unit 140. The processor unit 140 may be thermally coupled to an attach block (not shown). As indicated above, the attach block may be a copper plate or another conductor which conducts heat away from the electronic component. The attach block may be affixed to the top of the electronic component such as the processor unit 140. The processor unit 140 may be a central processor unit (CPU) or a distributed processor unit in a multi-processor environment, for example.

Heat generated by the processor unit 140 may be conducted by the attach block. The attach block may be coupled to the heat exchanger 110 via a heat pipe (not shown).

In embodiments of the present invention, the cooling fan 105 may bring in cool inlet air 106 from outside the system 100. The air may be pulled in from an inlet located on the bottom, top and/or side of the housing of system 100. It is recognized that the fan 105 may be any type of cooling fan such as a blower type fan that has an axial inlet and an radial outlet; an axial inlet and an axial outlet; a radial inlet and a radial outlet; and/or any combination thereof. It is recognized that any other types of fans may be used in accordance with embodiments of the present invention.

Cool air 107, generated at a predetermined velocity, may be radially pushed or blown over the heat exchanger 110 by the fan 105. Accordingly, the heat exchanger 110 loses some of its heat through conduction. The outlet air 109 that has passed over the heat exchanger may exit from an outlet located on the bottom, top, and/or side of the housing of system 100.

In embodiments of the present invention, a portion of the cooling air 107 from the fan (e.g., cooling air 108) may be diverted to pass over other components of the system 100. For example, cooling air 108 may be diverted to pass over processor unit VR 115,120, MCH 130, ICH 185, card 150, system VR 175 and/or other components of the system 100. The diverted cooling air may exit the system housing from system exit 190, for example. It is recognized that the system exit 190 can be located any where in the housing of the system 100. In embodiments of the invention, the cooling air 108 may be diverted naturally, by an opening in, for example, a duct between the cooling fan 105 and a heat exchanger 110, or a flexible duct that may place between the cooling fan and the heat exchanger 110, or by any other technique. Accordingly, a portion of the cooling air 107 from the fan 105 having a predetermined velocity may be used to cool the various components of system 100 more efficiently than conventional techniques.

Accordingly, in embodiments of the present invention, the coolest and/or the highest velocity air may be directed to the hottest components that may be located next to the processor unit.

Figure 2:
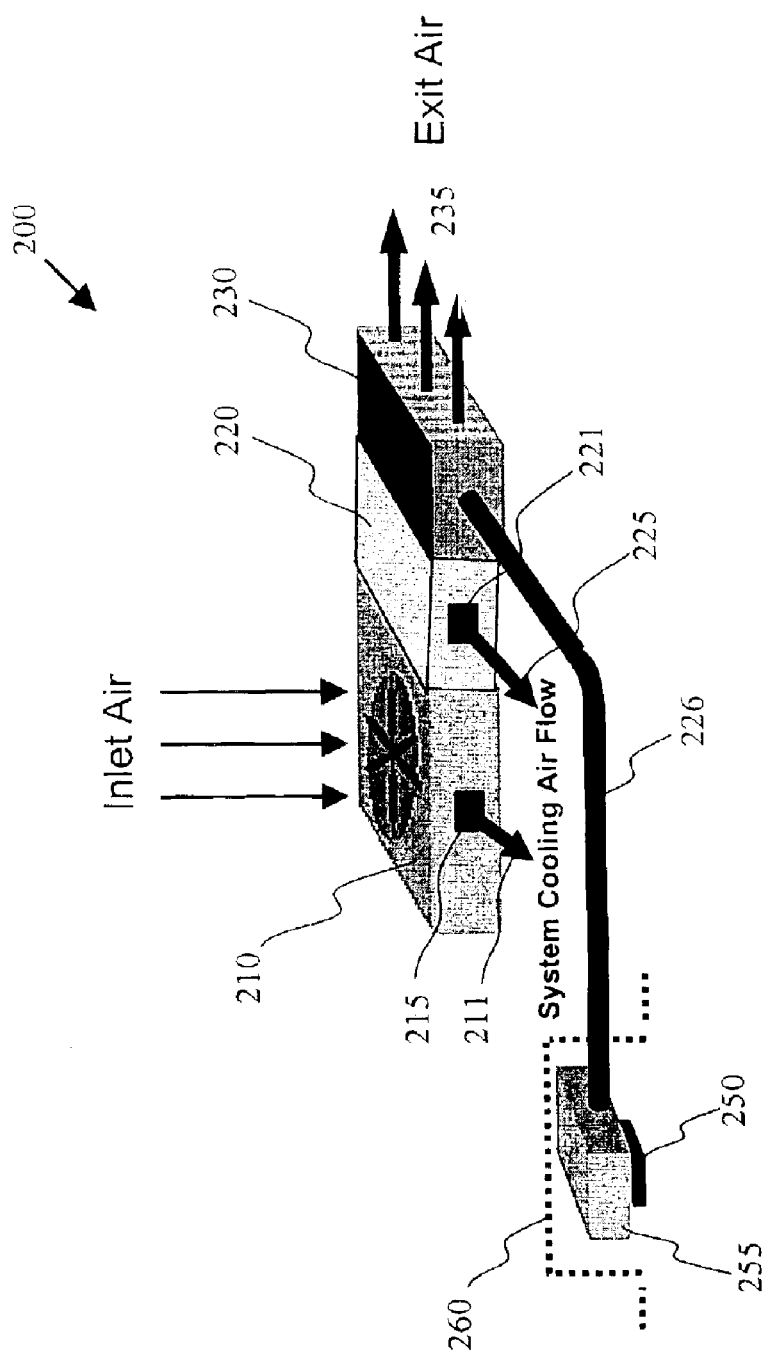
FIG. 2 is another diagrammatic representation of an embodiment of the present invention.

FIG. 2 a diagrammatic representation of a cooling system 200 in accordance with an embodiment of the present invention. The cooling system 200 may find application in mobile computers, desktop computers, hand held devices, main frames, or any other electronic device that may use a cooling fan to dissipate heat from an electronic component included in the device. The cooling system 200 includes a cooling fan 210, a heat exchanger 230, and a duct 220 (e.g., a plenum duct) that may be positioned between the cooling fan 210 and the heat exchanger 230.

As shown in FIG. 2, the system 200 may further include a heat pipe 226 that may thermally couple an attach block 255 to the heat exchanger 230. The attach block 255 may be secured to an electronic component 250 by thermal attach 260. As described above, the attach block 255 may draw heat away from the electronic component 250, while the heat pipe 226 may be used to move heat away from the attach block 255 and transfer it to the heat exchanger 230.

The cooling fan 210, the heat exchanger 230, attach block 255 and other components of system 200 may be the same as corresponding components shown in FIG. 1 or they may be different. The heat exchanger 230 may be a conventional heat exchanger made of aluminum or another metal and has a plurality of metal fins that may be used to dissipate heat. The electronic component 250 may be a processor or any other electronic component.

In embodiments of the present invention, a duct 220 (e.g., a plenum duct) may be positioned between the cooling fan 210 and the heat exchanger 230. The cooling fan 210 may pull inlet air and push cooling air through the duct 220 towards the heat exchanger 230. The duct 220 may include an opening 221, for example, to divert a portion of the cooling air generated by the fan 210. The diverted air 225 may be used to cool other components (as described above) of the computer system and may exit through an outlet in the computer system housing.

In embodiments of the present invention, the fan housing of cooling fan 210 may include an opening such as opening 215 to divert a portion of the cooling air generated by the fan 210. This diverted air 211 may be used to cool other components (as described above) of the computer system and may exit through an outlet in the computer system housing. In embodiments of the present invention, the fan housing opening 215 may be used in lieu of and/or in addition to the duct opening 221.

In either case, a portion of the cooling air generated by the cooling fan 210 may be diverted before it passes through the heat exchanger 230, in accordance with embodiments of the present invention. This diverted air may be used to efficiently cool electronic components other than the component thermally coupled to the heat exchanger 230. The remainder of the cooling air may pass over the heat exchanger 230 and may exit as heat exchanger exit air 235.

In embodiments of the present invention, the location, size, etc. of the duct opening 221 and/or the fan housing opening 215 may be varied as desired. It is recognized that the duct 220 and/or the housing of fan 210 may include more than one opening to divert a portion of the cooling air generated by the fan for components other than the heat exchanger 230.

Figure 3:
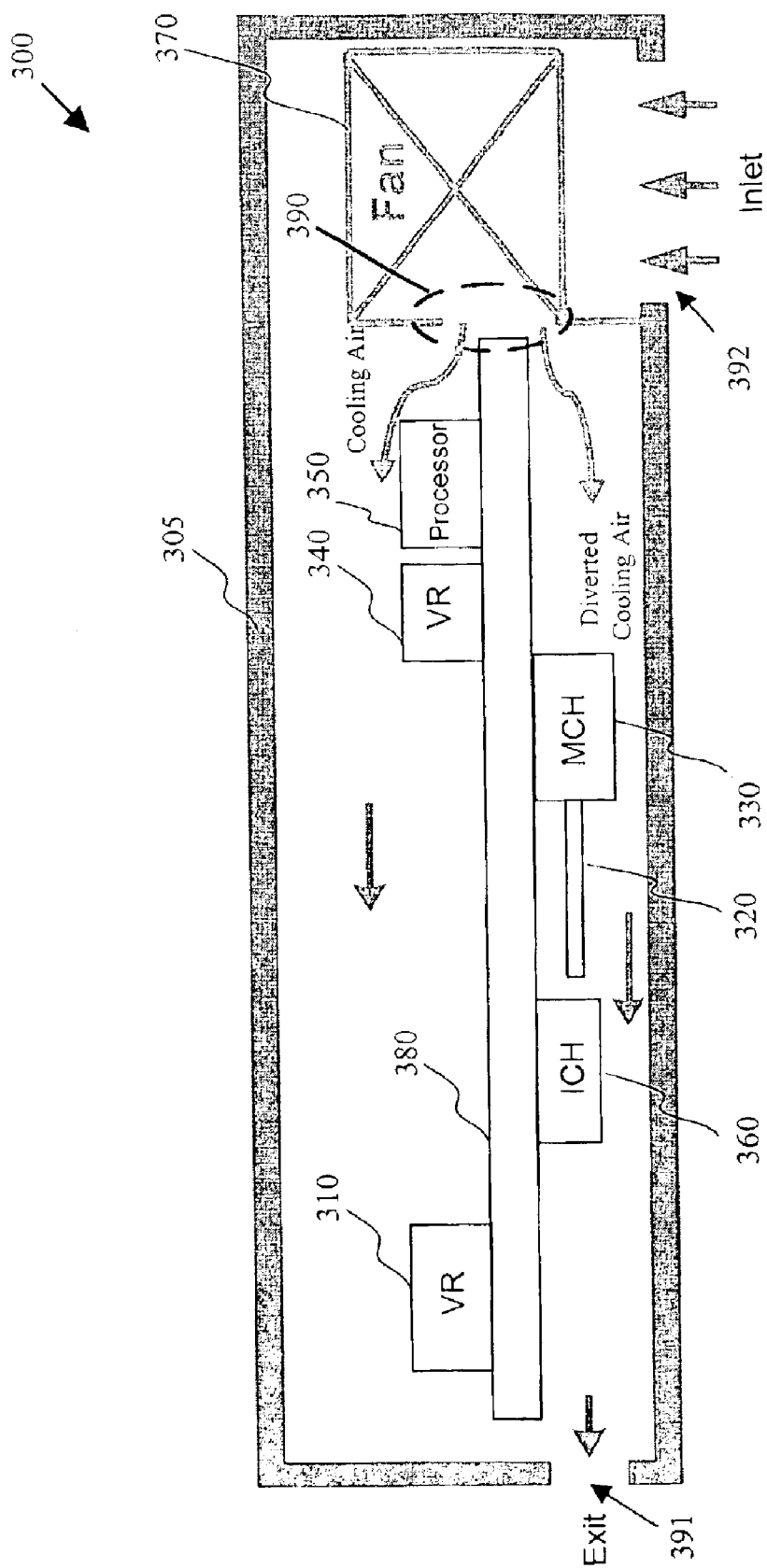
FIG. 3 is another block diagram in accordance with an embodiment of the present invention.

FIG. 3 is a diagram of a device 300 in accordance with an embodiment of the present invention. Device 300 may include a staging platform 380 on which a plurality of electronic components may be located. Such components may include, for example, a processor 350, VRs 340 and 310, memory 320, MCH 330, ICH 360, etc. It is recognized that device 300 may include other electronic components that are not shown for convenience. The staging platform may be a motherboard or any other type of card such as a printed circuit board or the like.

The device 300 may include housing 305. The device 300 may include a fan that may be used to cool one or more electrical component(s). In embodiments of the present invention, the fan 370 may include an opening 390. Air may be drawn in through inlet opening 392 of the system housing 305 and blown over the various components of the device 300 from opening 390. The fan may generate cooling air to cool heat producing components such as the processor 350.

In embodiments of the present invention, as shown in FIG. 3, a portion of the cooling air generated by the fan 370 may be diverted to cool other components that may also generate heat. As the high velocity cooling air passes over the various electrical components, it may absorb the generated heat and draw this heat away from the components and out of the housing 305 through exit 391. Accordingly, a plurality of electronic components may benefit from the active cooling air generated by the fan.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A system comprising:
an attach block thermally coupled to a first electronic component;
a heat exchanger thermally coupled to the attach block;
a cooling fan to receive inlet air and generate exit cooling air; and
a plenum duct between the cooling fan and the heat exchanger to direct the exit cooling air from the fan to the heat exchanger,
wherein a portion of the exit cooling air from the cooling fan is diverted towards a second electronic component included in the system.

2. The system of claim 1, wherein the cooling fan comprises:
a fan housing coupled to the plenum duct to direct the exit cooling air from the fan to the heat exchanger via the plenum duct, wherein the portion of the exit cooling air from the fan is diverted towards the second electronic component from the fan housing.

3. The system of claim 1, wherein the portion of the exit cooling air from the fan is diverted towards the second electronic component without passing through the heat exchanger.

4. The system of claim 1, wherein the portion of the exit cooling air from the fan is diverted towards the second electronic component by the plenum duct.

5. The system of claim 1, wherein the plenum duct contains an opening to divert the portion of the exit cooling air from the cooling fan towards the second electronic component.

6. The system of claim 1, further comprising:
a heat pipe coupled to the attach block and the heat exchanger.

7. The system of claim 1, wherein the first electronic component comprises a processor.

8. The system of claim 1, wherein the second electronic circuit comprises a memory controller hub.

9. The system of claim 1, wherein the second electronic component comprises an input/output hub.

10. The system of claim 1, wherein the second electronic component comprises a voltage regulator.

11. The system of claim 1, wherein the cooling fan is 5 mm to 30 mm in thickness.

12. The system of claim 1, wherein the attach block, first electronic component, second electronic component, cooling fan and heat exchanger are located inside a laptop computer.

13. The system of claim 1, wherein the attach block, first electronic component, second electronic component, cooling fan and heat exchanger are located inside a desktop computer.

14. The system of claim 1, wherein the first and second electronic components are included in a laptop computer.

15. The system of claim 1, wherein the first and second electronic components are included in a desktop computer.

16. The system of claim 1, wherein the heat exchanger is remotely located from the first component.

17. A method for cooling electronic components in a laptop computer, the method comprising:
generating cooling air by a cooling fan;
directing the cooling air from the cooling fan to a heat exchanger thermally coupled to a first electronic component in the laptop computer; and
diverting a portion of the cooling air generated by the fan towards a second electronic component.

18. The method of claim 17, further comprising:
diverting the portion of the generated cooling air towards the second electronic component without passing the generated cooling air through the heat exchanger.

19. The method of claim 18, further comprising:
diverting the portion of the generated cooling air towards a second electronic component in the laptop computer using a plenum duct.

20. The method of claim 18, further comprising:
diverting the portion of the generated cooling air towards a second electronic component by a cooling fan housing.

21. An apparatus for cooling electronic components, comprising:
a plenum duct between a cooling fan and a heat exchanger thermally coupled to a first electronic component, the plenum duct that is to direct cooling air generated by the fan to the heat exchanger,
wherein a portion of the cooling air generated by the cooling fan is diverted, from the plenum duct, towards a second electronic component before reaching the heat exchanger.

22. The apparatus of claim 21, further comprising:
an attach block thermally coupled to the first electronic component.

23. The apparatus of claim 22, further comprising:
a heat pipe that is to thermally couple the attach block and the heat exchanger.

24. The apparatus of claim 21, wherein the cooling fan comprises:
a fan housing coupled to the plenum duct to direct the cooling air generated by the fan to the heat exchanger via the plenum duct, wherein the portion of the cooling air generated by the fan is diverted towards the second electronic component from the fan housing.

25. The apparatus of claim 21, wherein the portion of the cooling air generated by the fan is diverted towards the second electronic component without passing through the heat exchanger.

26. The apparatus of claim 21, wherein the plenum duct contains an opening to divert the portion of the cooling air generated by the cooling fan towards the second electronic component.

27. The apparatus of claim 21, wherein the cooling fan is 5 mm to 30 mm in thickness.

28. The apparatus of claim 21, wherein the first electronic component is a processor of a laptop computer.

29. The apparatus of claim 21, wherein the first electronic component is a processor of a desktop computer.

* * * * *